(12) United States Patent
Kawata et al.

(10) Patent No.: US 11,529,945 B2
(45) Date of Patent: Dec. 20, 2022

(54) HYBRID VEHICLE AND CONTROL METHOD THEREOF

(71) Applicant: Toyota Jidosha Kabushiki Kaisha, Toyota (JP)

(72) Inventors: Kazunari Kawata, Toyota (JP); Ben Leslie Vogler, Nagoya (JP); Benjamin Michael Geller, Nagoya (JP); Mitsuhiro Fukao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 17/188,026

(22) Filed: Mar. 1, 2021

(65) Prior Publication Data

US 2021/0276535 A1    Sep. 9, 2021

(30) Foreign Application Priority Data

Mar. 6, 2020 (JP) .............................. JP2020-038577

(51) Int. Cl.
*B60W 20/15* (2016.01)
*B60W 20/20* (2016.01)

(52) U.S. Cl.
CPC ............ *B60W 20/15* (2016.01); *B60W 20/20* (2013.01); *B60W 2510/081* (2013.01); *B60W 2510/083* (2013.01)

(58) Field of Classification Search
CPC ................ B60W 20/15; B60W 20/20; B60W 2510/081; B60W 2510/083; B60W 2710/0644; B60W 2710/081; B60W 10/06; B60W 10/08; B60W 20/13; B60W 30/18072; Y02T 10/62; Y02T 10/70; Y02T 10/72; B60K 6/445
See application file for complete search history.

(56) References Cited

U.S. PATENT DOCUMENTS

| 2017/0066432 | A1 | 3/2017 | Shimakami |
| 2019/0210589 | A1* | 7/2019 | Tanaka ................ B60W 10/182 |

FOREIGN PATENT DOCUMENTS

| CN | 110121453 A | * | 8/2019 | ............. B60L 15/20 |
| JP | 2008179280 A | * | 8/2008 | |
| JP | 2011-188621 A | | 9/2011 | |
| JP | 2017-047844 A | | 3/2017 | |

* cited by examiner

*Primary Examiner* — Justin Holmes
(74) *Attorney, Agent, or Firm* — Dinsmore & Shohl LLP (57) ABSTRACT

The control device controls the first MG and the second MG so that the input power to the power storage device does not exceed the input limit Win. Further, the control device controls the first MG and the engine so that the rotational speed of the engine approaches the target when the engine is operating under load, when the input limit Win is lowered in a situation where the second MG moves backward while generating torque in the forward direction, and the engine is operating under load, the control device suppresses the amount of power generated by the first MG.

10 Claims, 9 Drawing Sheets

AFTER THE START OF THE SELF-SUPPORTING OPERATION

FIG.7

AFTER TRANSITION TO LOAD OPERATION
(REFERENCE EXAMPLE)

FIG.8

AFTER TRANSITION TO LOAD OPERATION
(REFERENCE EXAMPLE)

HYBRID VEHICLE AND CONTROL METHOD THEREOF

CROSS REFERENCE TO RELATED APPLICATIONS

This nonprovisional application claims priority to Japanese Patent Application No. 2020-038577 filed on Mar. 6, 2020 with the Japan Patent Office, the entire contents of which are hereby incorporated by reference.

BACKGROUND

Field

The present disclosure relates to a hybrid vehicle and a control method thereof.

Description of the Background Art

In the hybrid vehicle described in Japanese Patent Laying-Open No. 2017-47844, when a vehicle downhill movement in which the vehicle retracts while outputting a forward traveling torque from a second motor (a traveling motor) is detected, the fuel injection of the engine is stopped when an input limit Win (acceptable charging power) of the battery is equal to or less than a predetermined power. Then, the engine is motored by the first motor such that the engine operates at a higher rotational speed than before the detection of the vehicle downhill movement.

Thus, the rotational speed of the engine can be increased quickly, and the power consumption of the first motor can be increased quickly. As a result, it is possible to suppress the torque (regeneration torque) of the second motor from being greatly limited, and it is possible to suppress an increase in the speed at which the vehicle downhill movement (see Japanese Patent Laying-Open No. 2017-47844).

SUMMARY

In the hybrid vehicle in which the first and second motors and the engine are mounted as described above, when the engine is started and the accelerator pedal is depressed immediately after the occurrence of the vehicle downhill movement, the engine shifts from the self-supporting operation to the load operation, and the first motor generates torque (regeneration torque) in order to suppress overshoot of the engine rotation speed. Therefore, when the input limit Win of the electricity storage device that accepts the generated power of the first and second motors is lowered, the power generation of the second motor is limited by the power generation amount of the first motor, and as a result, the regenerative torque of the second motor is limited, and the speed of the vehicle downhill movement may increase.

In this case, although it is conceivable that the engine is motored by the first motor as in the hybrid vehicle described in Japanese Patent Laying-Open No. 2017-47844, there is a possibility that the driver feels discomfort because the engine rotational speed unintended by the driver is blown up.

The present disclosure has been made to solve such a problem, and an object of the present disclosure is to provide a hybrid vehicle and a control method thereof in which a driver can suppress vehicle downhill movement without feeling uncomfortable.

A hybrid vehicle of the present comprising an internal combustion engine, a first rotating electrical machine, a planetary gear mechanism in which the internal combustion engine, the first rotating electrical machine, and an output shaft are connected, a second rotating electrical machine connected to the output shaft, a power storage device capable of storing electric power generated by the first rotating electrical machine and electric power generated by the second rotating electrical machine, and a control device that controls the internal combustion engine and the first and second rotating electrical machines, wherein the control device controls the first and second rotating electrical machines so that input power to the power storage device does not exceed an input limit value indicating a limit of the input power, controls the first rotating electrical machine and the internal combustion engine so that a rotational speed of the internal combustion engine approaches a target when the internal combustion engine is operating under load, and under a situation of a vehicle downhill movement where the hybrid vehicle moves backward while generating torque in a forward direction by the second rotating electrical machine, when the input limit value is equal to or less than a threshold value and the internal combustion engine is operating under load, the control device suppresses a power generation amount of the first rotating electrical machine to be equal to or less than a predetermined value.

A control method of the present disclosure is a method of controlling a hybrid vehicle, the hybrid vehicle including, an internal combustion engine, a first rotating electrical machine, a planetary gear mechanism in which the internal combustion engine, the first rotating electrical machine, and an output shaft are connected, a second rotating electrical machine connected to the output shaft; and a power storage device capable of storing electric power generated by the first rotating electrical machine and electric power generated by the second rotating electrical machine, the method comprising, controlling the first and second rotating electrical machines so that input power to the power storage device does not exceed an input limit value indicating a limit of the input power, controlling the first rotating electrical machine and the internal combustion engine so that a rotational speed of the internal combustion engine approaches a target when the internal combustion engine is operating under load; and suppressing a power generation amount of the first rotating electrical machine to be equal to or less than a predetermined value, under a situation of a vehicle downhill movement where the hybrid vehicle moves backward while generating torque in a forward direction by the second rotating electrical machine, when the input limit value is equal to or less than a threshold value and the internal combustion engine is operating under load.

In the hybrid vehicle and the control method thereof described above, when the input limit value (Win) is lower than or equal to the threshold value in a situation where the vehicle falls down, when the internal combustion engine is driving under load, the power generation amount of the first rotating electrical machine is suppressed. Thus, the power generation amount of the second rotating electrical machine is secured without motoring the first rotating electrical machine, and the torque (regeneration torque) of the second rotating electrical machine is secured. Therefore, according to the hybrid vehicle and the control method thereof, it is possible to prevent the driver from falling down without feeling uncomfortable.

Under the situation of the vehicle downhill movement, when the input limit value is lower than or equal to the threshold value and the internal combustion engine is operating under load, the control device suppresses a regenerative torque of the first rotating electrical machine to be equal to or less than a predetermined limit value.

Alternatively, in the control method, under the situation of the vehicle downhill movement, when the input limit value is lower than or equal to the threshold value and the internal combustion engine is operating under load, the suppressing includes suppressing a regenerative torque of the first rotating electrical machine to be equal to or less than a predetermined limit value.

In the hybrid vehicle and the control method thereof, by suppressing the regenerative torque of the first rotating electrical machine to be equal to or less than the limit value, the power generation amount of the first rotating electrical machine is suppressed. Therefore, according to the hybrid vehicle and the control method thereof, it is possible to prevent the vehicle from falling down without giving a sense of discomfort to the driver.

The limit value is calculated based on the input limit value and a required power of the second rotating electrical machine.

Accordingly, it is possible to suppress a significant deterioration in the controllability of the rotational speed of the internal combustion engine, which is caused by excessive restriction of the regenerative torque of the first rotating electrical machine.

Under the situation of the vehicle downhill movement, when the input limit value is lower than or equal to the threshold value and the internal combustion engine is operating under load, the control device suppresses a rate of change of the rotational speed of the internal combustion engine to be equal to or less than a predetermined limit value when the rotational speed of the internal combustion engine is lowered.

Alternatively, under the situation of the vehicle downhill movement, when the input limit value is lower than or equal to the threshold value and the internal combustion engine is operating under load, the suppressing includes suppressing a rate of change of the rotational speed of the internal combustion engine to be equal to or less than a predetermined limit value when the rotational speed of the internal combustion engine is lowered.

In the hybrid vehicle and the control method thereof, the power generation amount of the first rotating electrical machine is limited by suppressing the rate of change when decreasing the rotational speed of the internal combustion engine to be equal to or less than the limit value. Therefore, according to the hybrid vehicle and the control method thereof, it is possible to prevent the vehicle from falling down without giving a sense of discomfort to the driver.

The limit value is calculated based on a friction torque of the internal combustion engine.

Thus, it is possible to prevent the rate of change in the rotational speed of the internal combustion engine when the rotational speed of the internal combustion engine is reduced from being restricted more than necessary, and to prevent the controllability of the rotational speed of the internal combustion engine from being significantly lowered.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments of the present disclosure will be described in detail with reference to the drawings. Hereinafter, a plurality of embodiments will be described, but it is expected from the beginning of the application to appropriately combine the configurations described in the embodiments. In the drawings, the same or corresponding portions are denoted by the same reference numerals, and the description thereof will not be repeated.

Embodiment 1

<Configuration of Hybrid Vehicle>

Figure 1:
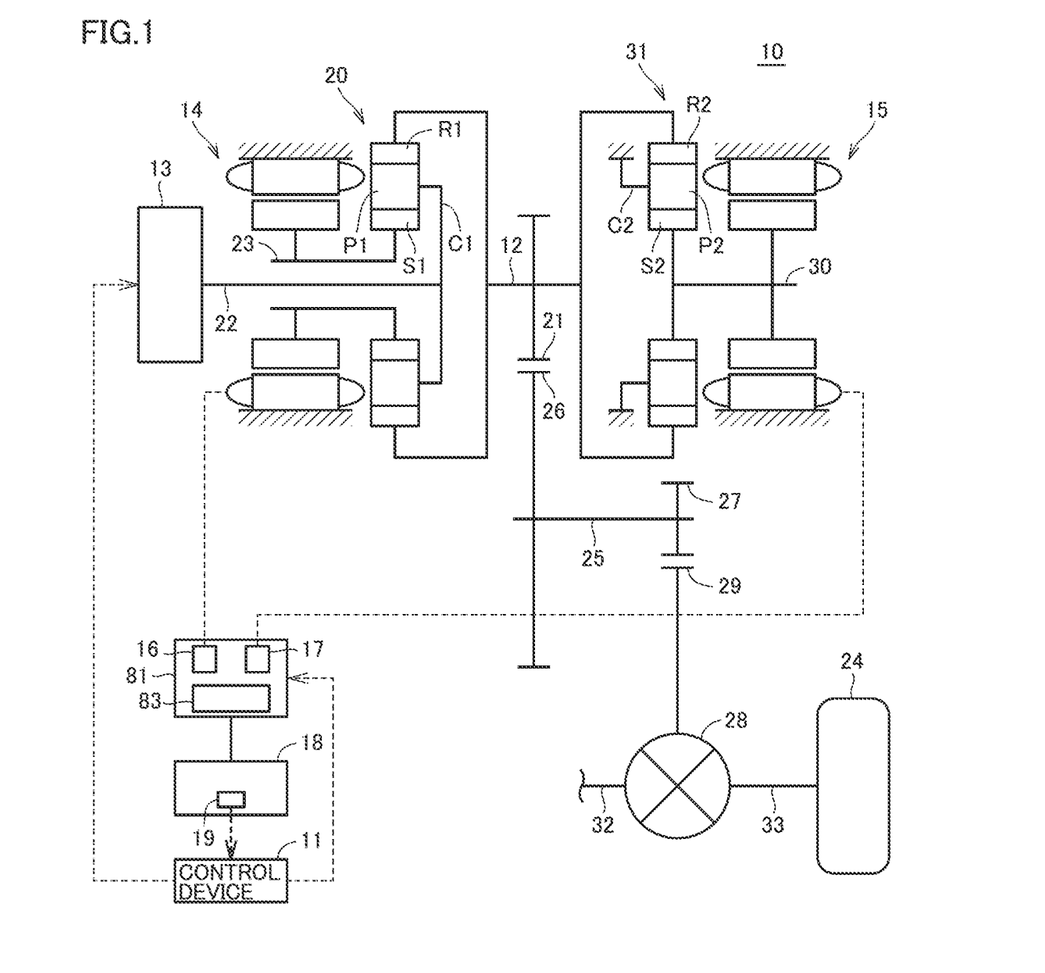
FIG. 1 is an overall configuration diagram of a hybrid vehicle according to a first embodiment of the present disclosure.

FIG. 1 is an overall configuration diagram of a hybrid vehicle according to a first embodiment of the present disclosure; Referring to FIG. 1, hybrid vehicle 10 includes engine 13, first motor generator (Hereinafter, this is referred to as a "first MG (Motor Generator)") 14, second MG 15, planetary gear mechanisms 20 and 31, PCU (Power Control Unit) 81, power storage device 18, and control device 11.

Each of the first MG 14 and the second MG 15 is a rotating electrical machine having a function as a motor that outputs torque by being supplied with electric power and a power generation function as a generator that generates electric power by being supplied with torque. The first MG 14 and the second MG 15 are AC motors such as a permanent magnet synchronous motor and an induction motor, for example.

The first MG 14 and the second MG 15 are electrically connected to the power storage device 18 through the PCU 81. The PCU 81 includes a first inverter 16, a second inverter 17, and a converter 83. The first inverter 16 drives the first MG 14. The second inverter 17 drives the second MG 15. Converter 83 boosts the DC voltage supplied to first inverter 16 and second inverter 17 above the voltage of power storage device 18.

The power storage device 18 is a rechargeable power storage element. The power storage device 18 includes, for example, a secondary battery such as a lithium ion battery or a nickel metal hydride battery, and a power storage element such as an electric double layer capacitor. The lithium ion secondary battery is a secondary battery using lithium as a charge carrier, and may include a so-called all-solid battery using a solid electrolyte as well as a general lithium ion secondary battery in which an electrolyte is liquid.

The power storage device 18 can receive and store the electric power generated by the first MG 14 through the PCU 81, and can supply the stored electric power to the second MG 15 through the PCU 81. Further, the power storage device 18 can also receive and store the electric power generated by the second MG 15 during deceleration of the vehicle or the like through the PCU 81, and can also supply the stored electric power to the first MG 14 through the PCU 81 or the like during start-up of the engine 13.

The power storage device 18 includes a monitoring unit 19 that monitors the state of the power storage device 18. The monitoring unit 19 includes a voltage sensor for detecting the voltage VB of the power storage device 18, a current sensor for detecting the current IB input to and output from the power storage device 18, and a temperature sensor for detecting the temperature TB of the power storage device 18 (none of which are shown). The current sensor detects a current (charging current) input to the power storage device 18 as a negative value, and detects a current (discharge current) output from the power storage device 18 as a positive value. The detection result of each sensor is transmitted to the control device 11.

The engine 13 and the first MG 14 are connected to the planetary gear mechanism 20. The planetary gear mechanism 20 transmits the torque output from the engine 13 by dividing the torque into the first MG 14 and the output shaft 12. The planetary gear mechanism 20 is a single pinion type planetary gear mechanism, and is arranged on the same axis as the output shaft 22 of the engine 13.

The planetary gear mechanism 20 includes a sun gear S1, a ring gear R1 coaxially arranged with the sun gear S1, a plurality of pinion gears P1 meshing with the sun gear S1 and the ring gear R1, and a carrier C1 for holding the pinion gear P1 so as to be able to rotate and revolve. The output shaft 22 of the engine 13 is connected to the carrier C1. The rotation shaft 23 of the first MG 14 is connected to the sun gear S1. The ring gear R1 is connected to the output shaft 12.

The carrier C1 to which the output torque of the engine 13 is transmitted functions as an input element, the ring gear R1 that outputs torque to the output shaft 12 functions as an output element, and the sun gear S1 to which the rotation shaft 23 of the first MG 14 is connected functions as a reaction force element. That is, the planetary gear mechanism 20 divides the output of the engine 13 into the first MG 14 side and the output shaft 12 side.

The second MG 15 is connected to the planetary gear mechanism 31. The planetary gear mechanism 31 is also a single pinion type planetary gear mechanism, and is arranged on the same axis as the rotation shaft 30 of the second MG 15. The planetary gear mechanism 31 includes a sun gear S2, a ring gear R2 coaxially arranged with the sun gear S2, a plurality of pinion gears P2 meshing with the sun gear S2 and the ring gear R2, and a carrier C2 for holding the pinion gear P2 so as to be able to rotate and revolve. The rotation shaft 30 of the second MG 15 is connected to the sun gear S2. The carrier C2 is fixed to a housing or the like so as not to rotate. The ring gear R2 is connected to the output shaft 12.

The planetary gear mechanism 31 functions as a reduction gear that reduces the output of the second MG 15. The second MG 15 is a high-rotation rotating electrical machine. Then, the output torque of the second MG 15 is output to the output shaft 12 through the planetary gear mechanism 31, and is added to the torque output from the ring gear R1 of the planetary gear mechanism 20 in the output shaft 12.

The counter shaft 25 is arranged parallel to the output shaft 12. The counter shaft 25 is provided with a driven gear 26, and the driven gear 26 meshes with an output gear 21 provided on the output shaft 12. The counter shaft 25 is further provided with a drive gear 27, and the drive gear 27 meshes with a ring gear 29 of the differential gear 28. Torque is transmitted to the drive wheel 24 through the drive shafts 32 and 33 extending from the differential gear 28 in the left-right direction.

In this example, the planetary gear mechanism 31 as a reduction gear is provided between the second MG 15 and the output shaft 12, but the planetary gear mechanism 31 may not be provided. At this time, the rotation shaft 30 of the second MG 15 and the output shaft 12 are arranged so as to be offset, and a drive gear may be provided on the rotation shaft 30 to engage with the driven gear 26 separately from the output gear 21.

Figure 2:
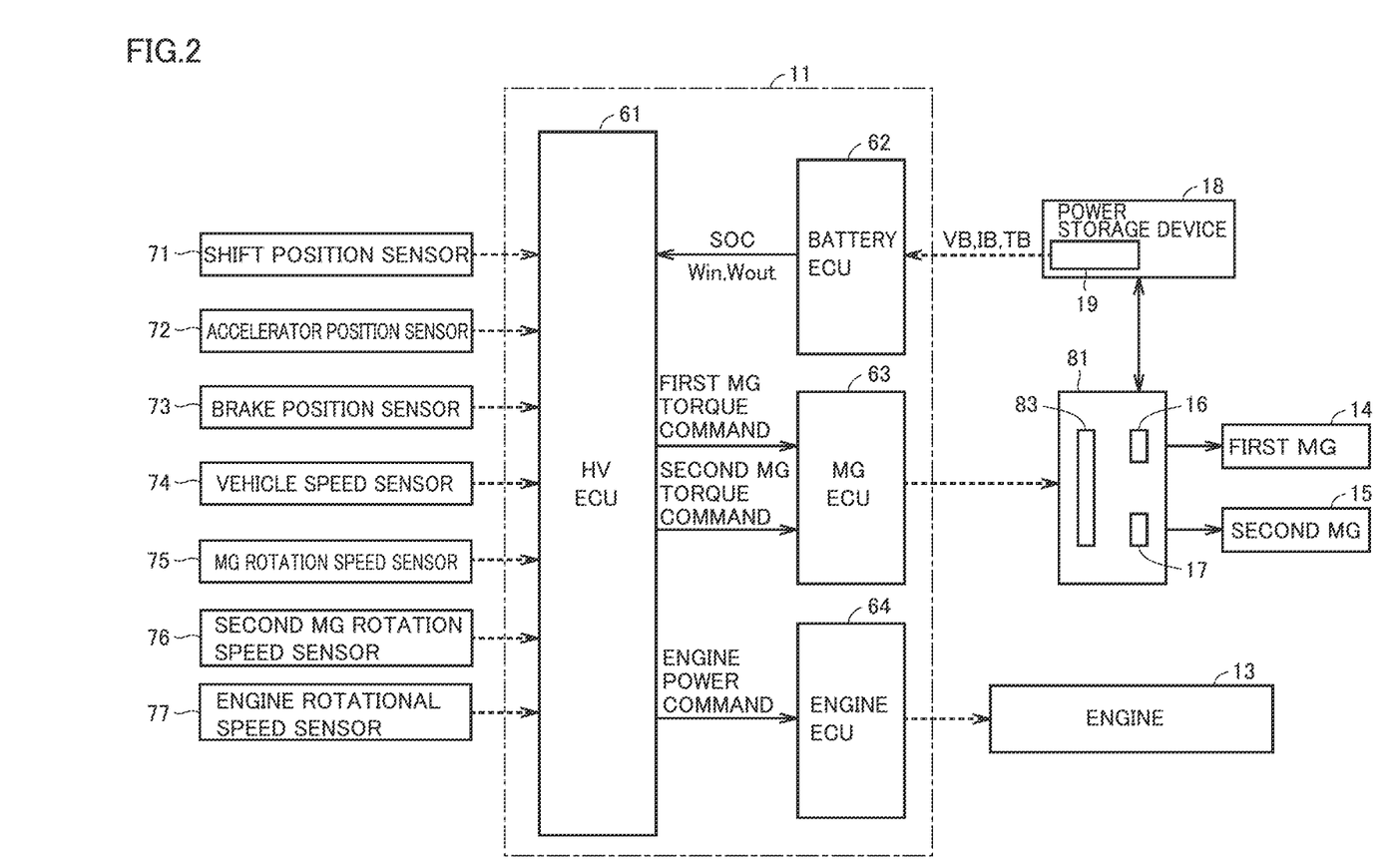
FIG. 2 is a block diagram showing an example of a configuration of a control device shown in FIG. 1.

FIG. 2 is a block diagram showing an example of the configuration of the control device 11 shown in FIG. 1. Referring to FIG. 2, control device 11 includes HV-ECU (Electronic Control Unit) 61, battery ECU 62, MG-ECU 63, and engine ECU 64.

Each ECU includes an input/output device for controlling transmission and reception of signals to and from various sensors and other ECUs, a memory (ROM (Read Only Memory) and RAM (Random Access Memory)) for storing various control programs, maps, and the like, a central processing unit (CPU) for executing the control program, a counter for time measurement, and the like.

Signals from various sensors are input to the HV-ECU 61. The various sensors include, for example, a shift position sensor 71, an accelerator position sensor 72, a brake position sensor 73, a vehicle speed sensor 74, a first MG rotation speed sensor 75, a second MG rotation speed sensor 76, and an engine rotational speed sensor 77.

The shift position sensor 71 detects an operation position of a shift lever (not shown). The accelerator position sensor 72 detects the amount of depression of the accelerator pedal by the driver. The brake position sensor 73 detects the amount of depression of the brake pedal by the driver. The vehicle speed sensor 74 detects the speed (vehicle speed) V of the hybrid vehicle 10. The vehicle speed sensor 74 detects the vehicle speed V as a positive value when the vehicle moves forward, and detects the vehicle speed V as a negative value when the vehicle moves backward. The first MG rotation speed sensor 75 detects the rotation speed Ng of the first MG 14. The second MG rotation speed sensor 76 detects the rotation speed Nm of the second MG 15. The engine rotational speed sensor 77 detects a rotational speed (Hereinafter, the engine rotational speed is also referred to as "engine rotational speed".) Ne of the engine 13.

Battery ECU 62 calculates SOC (State Of Charge) of power storage device 18 based on the detection result received from monitoring unit 19 of power storage device 18. The SOC is a percentage of the current amount of stored electricity with respect to the full charge capacity of the power storage device 18. As a method of calculating SOC, for example, various known methods such as a method using current value integration (Coulomb count) or a method using an estimation of open circuit voltage (OCV) can be employed.

Battery ECU 62 also calculates input limit Win and output limit Wout of power storage device 18. The input limit Win indicates a limit of the input power to the power storage device 18, in other words, an allowable input power indicating an upper limit of the power that can be accepted by the power storage device 18. The output limit Wout indicates a limit of the output power from the power storage device 18, in other words, an allowable output power indicating an upper limit of the power that can be output from the power storage device 18.

In the first embodiment, since the current input to the power storage device 18 is a negative value and the current output from the power storage device 18 is a positive value, the input power (charging power) to the power storage device 18 and the output power (discharge power) from the power storage device 18 are also a negative value and a positive value, respectively, and the input limit Win and the output limit Wout are also a negative value and a positive value, respectively.

The input limit Win decreases in a high SOC state or under an extremely low temperature (The magnitude (absolute value) of the input limit Win is reduced). The decrease in the input limit Win means that the electric power (charging electric power) that can be accepted by the power storage device 18 is reduced. Further, the output limit Wout decreases in a low SOC state or under an extremely low temperature. The decrease in the output limit Wout means that the power (discharge power) that can be output from the power storage device 18 is reduced.

Battery ECU 62 outputs signals indicating the calculated SOC, input limit Win, and output limit Wout to HV-ECU 61.

The HV-ECU 61 is a control device for performing cooperative control of the engine 13, the first MG 14, and the second MG 15. Hybrid vehicle 10 can be set or switched between a traveling mode (Hereinafter, this mode is referred to as "HV traveling mode") using engine 13 as a power source and a traveling mode (Hereinafter, this mode is referred to as an "EV traveling mode") in which second MG 15 is driven by electric power stored in power storage device 18 to travel. The mode setting and switching are executed by the HV-ECU 61. The EV traveling mode is a mode selected, for example, when the vehicle speed is low and the required driving force is small in a low load driving range, and the engine 13 is stopped and the output torque of the second MG 15 is used as a driving source for traveling. The HV travel mode is a mode selected when the vehicle speed is high and the required driving force is large in a high load driving range, and a torque obtained by adding the output torque of the engine 13 and the output torque of the second MG 15 is used as a drive source for travel.

In the HV traveling mode, when torque output from the engine 13 is transmitted to the drive wheel 24, a reaction force is applied to the planetary gear mechanism 20 by the first MG 14. Therefore, the sun gear S1 functions as a reaction force element. That is, in order to apply a torque corresponding to the target engine torque based on the acceleration request to the drive wheel 24, the reaction torque corresponding to the target engine torque is output to the first MG 14.

More specifically, the HV-ECU 61 determines a required driving force according to the accelerator pedal position, the vehicle speed, and the like determined by the depression amount of the accelerator pedal, and obtains the required power of the engine 13 from the required driving force. The HV-ECU 61 controls the vehicle while switching the traveling mode so that the system efficiency with respect to the required power becomes optimal. Further, the HV-ECU 61 determines an engine operating point (rotational speed and torque) at which the fuel consumption of the engine 13 is minimized, for example, from the required power of the engine 13.

The torque and the rotational speed of the first MG 14 are controlled such that the engine 13 operates at the above-described operating point. The first MG 14 can arbitrarily control the torque and the rotation speed in accordance with the current value to be energized and the frequency thereof. In the HV traveling mode, the HV-ECU 61 controls the engine 13, the first MG 14, and the second MG 15 such that the required driving force determined according to the accelerator pedal position, the vehicle speed, and the like is output to the output shaft 12 (drive wheel 24).

HV-ECU 61 calculates a command indicating torque Tg to be generated in first MG 14 (first MG torque command) and a command indicating torque Tm to be generated in second MG 15 (second MG torque command), and outputs the calculated command to MG-ECU 63. In addition, HV-ECU 61 calculates a command (engine power command) indicating power Pe to be generated in engine 13, and outputs the command to engine ECU 64.

The HV-ECU 61 considers the input limit Win and the output limit Wout of the power storage device 18 when calculating the second MG torque command. Specifically, assuming that the required power of the first MG 14 based on the first MG torque command (first MG required power) is Pgr and the required power of the second MG 15 based on the second MG torque command (second MG required power) is Pmr, the HV-ECU 61 calculates the second MG torque command so as to satisfy the following expression.

$$Win \leq Pgr + Pmr \leq Wout \tag{1}$$

The first MG required power Pgr is the product of the first MG torque command and the rotational speed of the first MG 14, and the second MG required power Pmr is the product of the second MG torque command and the rotational speed of the second MG 15. When Pgr+Pmr is less than the input limit Win (When Pgr+Pmr is a negative value and the absolute value thereof is larger than the absolute value of the input limit Win, Pgr+Pmr is a negative value), the second MG torque command is limited so that Pgr+Pmr is equal to or greater than the input limit Win (The absolute value of Pgr Pmr (negative value) is equal to or smaller than the absolute value of the input limit Win).

The MG-ECU 63 generates a signal for driving the first MG 14 based on the first MG torque command received from the HV-ECU 61, and outputs the signal to the first inverter 16. Further, MG-ECU 63 generates a signal for driving second MG 15 based on the second MG torque command received from HV-ECU 61, and outputs the signal to second inverter 17.

The engine ECU 64 performs various controls on the respective units of the engine 13, such as a throttle valve, an injector, and an ignition plug, based on an engine power command received from the HV-ECU 61.

In FIG. 2, the control device 11 includes an HV-ECU 61, a battery ECU 62, an MG-ECU 63, and an engine ECU 64, which are divided for each function. The control device 11 may be configured by one ECU in which these ECUs are integrated.

<Description of Vehicle Displacement>

In the hybrid vehicle 10 configured as described above, it is assumed that the vehicle downhill movement occurs under a situation where the input limit Win of the power storage device 18 is reduced (the magnitude of the input limit Win is small). The vehicle downhill movement is a state in which the hybrid vehicle 10 is retracted while the second MG 15 generates the torque Tm in the forward direction.

When the engine 13 is started and the accelerator pedal is depressed immediately after the occurrence of the vehicle downhill movement, there is a possibility that the vehicle downhill movement is increased by limiting the torque of the second MG 15. Hereinafter, this situation will be described.

Figure 3:
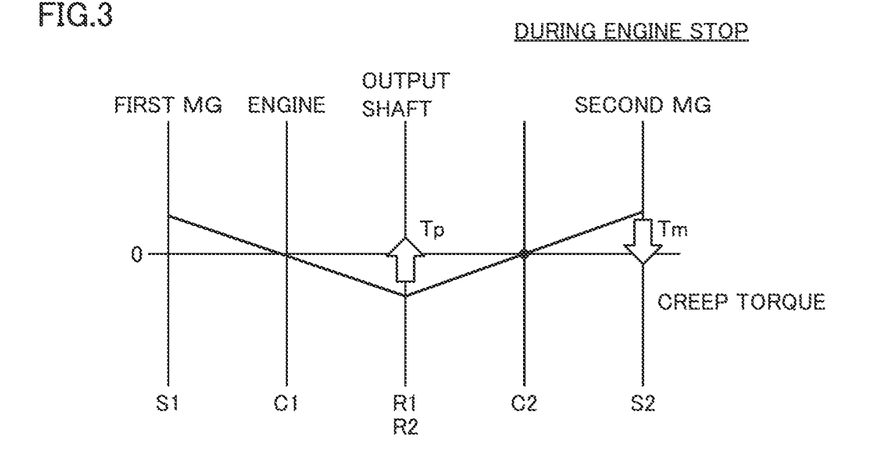
FIG. 3 is an alignment chart when the engine is stopped during the vehicle downhill movement occurs with low Win.

FIG. 3 is an alignment chart showing the relationship between the rotational speed and torque of the engine 13, the first MG 14, the second MG 15, and the output shaft 12 when the engine 13 is stopped. In FIG. 13, the vehicle downhill movement occurs in a situation where the input limit Win of the power storage device 18 decreases (Hereinafter, this is referred to as "low Win downhill movement").

In FIG. 3 and FIGS. 5, 7, 9, and 13 to be described later, a vertical line at the center indicates a state of the output shaft 12 to which the ring gear R1 of the planetary gear mechanism 20 and the ring gear R2 of the planetary gear mechanism 31 are connected. The left three vertical lines correspond to the planetary gear mechanism 20, and the right three vertical lines correspond to the planetary gear mechanism 31. In the illustrated example, the intervals of the vertical lines are equal, but precisely, the interval of the vertical axis is the gear ratio of each planetary gear mechanism.

The position of the line on the vertical axis indicates the rotational speed of each element (the engine 13, the first MG 14, the second MG 15, and the output shaft 12). The rotation speed of the carrier C2 of the planetary gear mechanism 31 is always 0. In the figure, "Te" represents the torque of the engine 13, and "Tg" represents the torque of the first MG 14. "Tm" indicates the torque of the second MG 15, and "Tp" indicates the torque of the output shaft 12. The upward arrow indicates the torque in the positive direction, the downward arrow indicates the torque in the negative direction, and the length of the arrow indicates the magnitude of the torque.

Referring to FIG. 3, a negative rotation speed of output shaft 12 indicates that the vehicle is receding. While the engine 13 is stopped, the second MG 15 outputs a creep torque for generating a creep in the hybrid vehicle 10. Since the rotation direction of the second MG 15 and the direction of the output torque Tm are different, the second MG 15 is in a regenerative state and generates power.

Figure 4:
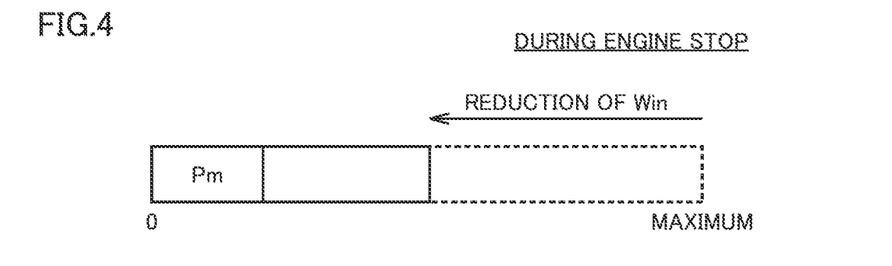
FIG. 4 is a diagram showing input limit Win and charging power of the power storage device under the situation shown in FIG. 3.

FIG. 4 is a diagram showing input limit Win and charging power of power storage device 18 under the situation shown in FIG. 3. Referring to FIG. 4, the overall length including the dotted line portion indicates the maximum value of the input limit Win when the input limit Win is not reduced. In a high SOC state or an extremely low temperature state, the input limit Win decreases to a length indicated by a solid line, and the charging power of the power storage device 18 is limited to the input limit Win or less. Pm is the power generated by the second MG 15 generating the creep torque.

Figure 5:
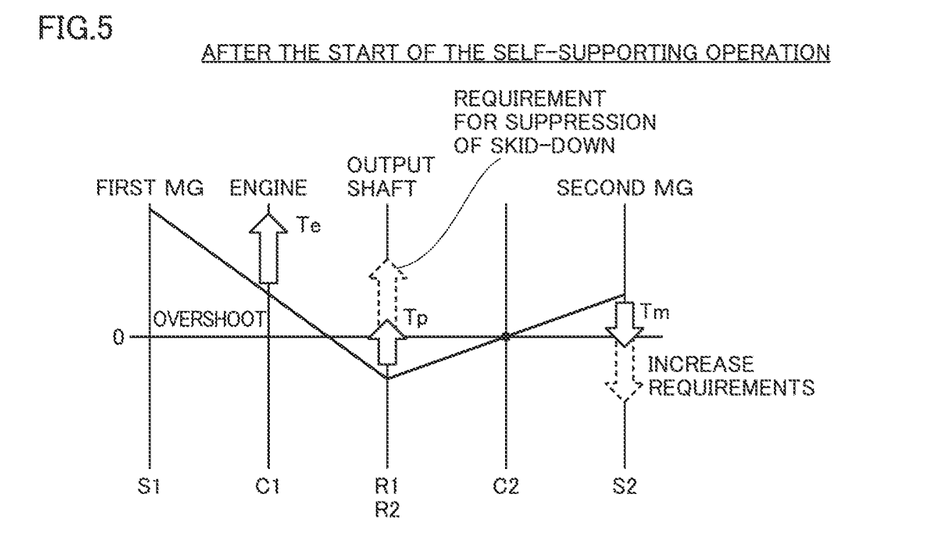
FIG. 5 is an alignment chart immediately after the engine starts to operate self-supportingly during the vehicle downhill movement occurs with low Win.

FIG. 5 is a collinear diagram immediately after the engine 13 starts to operate self-supportingly during the vehicle downhill movement occurs with low Win. Referring to FIG. 5, immediately after the engine 13 is started, the engine 13 outputs torque Te to increase the engine rotational speed to a prescribed rotational speed (a self-supporting operating rotational speed), and the engine rotational speed overshoots the prescribed rotational speed.

In order to suppress vehicle downhill movement, it is necessary to increase the torque Tm of the second MG 15. When the torque Tm of the second MG 15 is increased, the power generated by the second MG 15 is increased.

Figure 6:
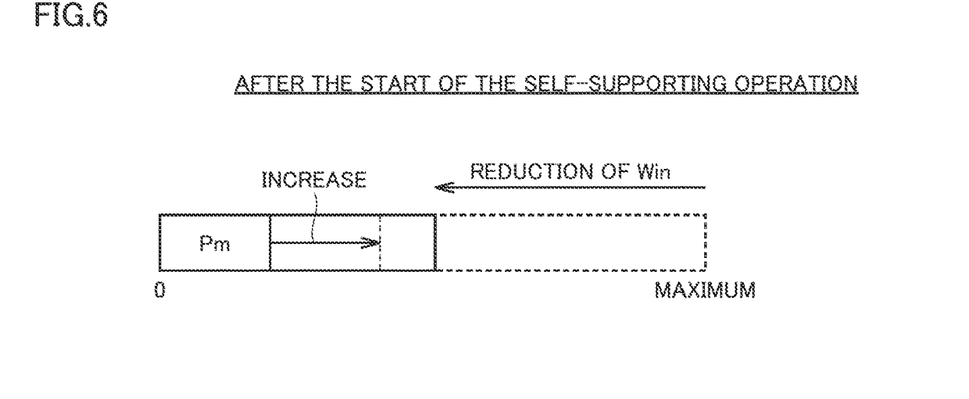
FIG. 6 is a diagram showing input limit Win and charging power of the power storage device under the situation shown in FIG. 5.

FIG. 6 is a diagram showing input limit Win and charging power of power storage device 18 under the situation shown in FIG. 5. Although it is necessary to increase the torque Tm of the second MG 15 in order to suppress the vehicle slippage, when the torque Tm is increased, the generated power Pm of the second MG 15 also increases. (See FIG. 6.)

Figure 7:
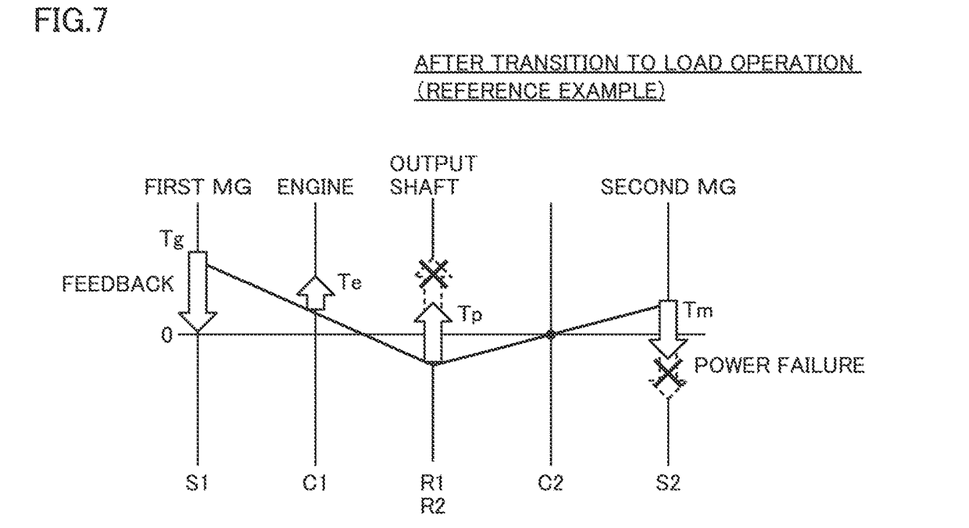
FIG. 7 is, as a reference example, a collinear diagram after the engine shifts from the self-supporting operation to the load operation during the vehicle downhill movement occurs with low Win in a conventional hybrid vehicle in which the countermeasure of the present disclosure is not adopted.

As a reference example, FIG. 7 is a collinear diagram after the engine 13 shifts from the self-supporting operation to the load operation during the vehicle downhill movement occurs with low Win in a conventional hybrid vehicle in which the countermeasure of the present disclosure is not adopted. More specifically, FIG. 5 shows the states of the respective elements after the engine 13 is started during the low Win reduction and the engine 13 is shifted from the self-supporting operation to the load operation because the accelerator pedal is depressed immediately after the engine 13 is started.

Referring to FIG. 7, when engine 13 shifts from the self-supporting operation to the load operation, feedback control for approaching the engine rotational speed to the target rotational speed is activated. That is, in order to lower the engine rotational speed exceeding the target rotational speed to the target rotational speed due to the overshoot after the engine is started, the first MG 14 outputs the torque Tg in the direction in which the engine rotational speed is lowered as the operation amount of the feedback control. In this case, since the rotation direction of the first MG 14 and the direction of the torque Tg are different, the first MG 14 generates electric power. Then, the room for increasing the power generation power Pm of the second MG 15 is reduced, and the second MG 15 may not be able to output a sufficient torque Tm for suppressing vehicle downhill movement.

Figure 8:
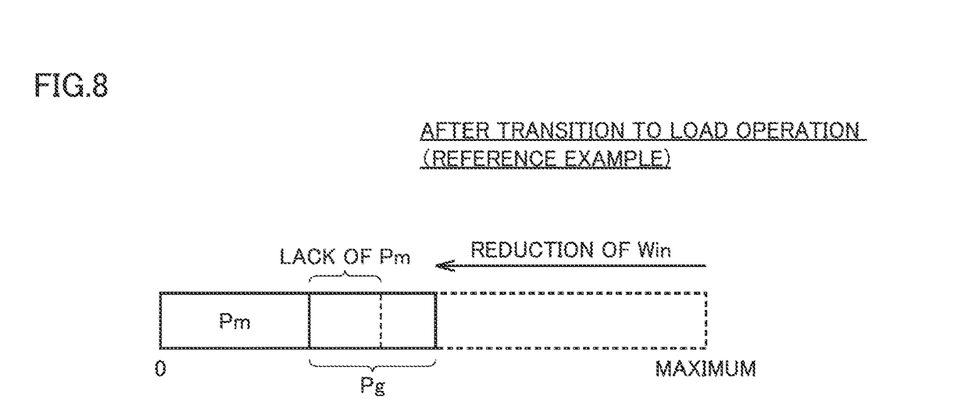
FIG. 8 is a diagram showing input limit Win and charging power of the power storage device under the situation shown in FIG. 7.

FIG. 8 is a diagram showing input limit Win and charging power of power storage device 18 under the situation shown in FIG. 7. Referring to FIG. 8, Pg is the power generated by first MG 14 when first MG 14 outputs torque Tg in the direction of decreasing the engine rotational speed. Since the generated power Pg of the first MG 14 becomes the charging power of the power storage device 18, the generated power Pm of the second MG 15 is limited by the generated power Pg. If the generated power Pm is insufficient, the second MG 15 cannot generate a sufficient torque Tm for suppressing the vehicle downhill movement, and the vehicle downhill movement may increase.

Thus, in the hybrid vehicle 10 according to the first embodiment, the power generation power Pg of the first MG 14 is limited when the input limit Win of the power storage device 18 is lowered and the engine 13 is operating under load in a situation where the vehicle downhill movement. Thus, the power generation power Pm of the second MG 15 is secured, and the torque Tm of the second MG 15 is secured. Therefore, downhill movement of the vehicle can be suppressed.

Figure 9:
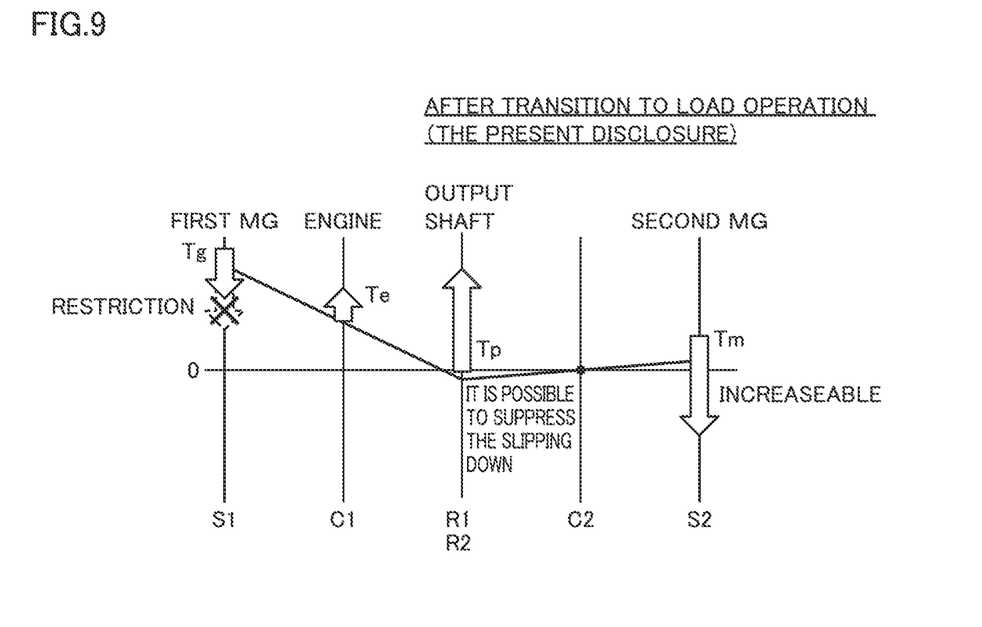
FIG. 9 is an alignment chart of the hybrid vehicle according to the first embodiment after the engine transitions from the self-supporting operation to the load operation during the vehicle downhill movement occurs with low Win.

FIG. 9 is a collinear diagram showing the hybrid vehicle 10 according to the first embodiment after the engine 13 shifts from the self-supporting operation to the load operation during the vehicle downhill movement occurs with low Win. FIG. 9 is compared with FIG. 7.

Referring to FIG. 9, when transition is made from the self-supporting operation to the load operation immediately after engine 13 is started, first MG 14 outputs torque Tg in the direction of decreasing engine rotation speed Ne. Thus, the engine rotational speed Ne exceeding the target rotational speed due to the overshoot after the engine is started is lowered to the target rotational speed. (See the description in FIG. 7). Since the torque Tg is different from the rotational direction, the first MG 14 generates electric power.

When the power generation power Pm of the second MG 15 is limited by the power generation of the first MG 14, the second MG 15 cannot generate a sufficient torque Tm, and the speed of the vehicle downhill movement can be increased. However, in the hybrid vehicle 10 according to the first embodiment, the power generation power Pg of the first MG 14 is suppressed under such a situation. That is, when the input limit Win of the power storage device 18 is lowered and the engine 13 is operating under load in a situation where the vehicle downhill movement, the power generation power Pg of the first MG 14 is suppressed.

In the first embodiment, the generated power Pg is suppressed by providing a limit value to the torque Tg of the first MG 14. Since the generated power Pg is suppressed by limiting the torque Tg of the first MG 14, the generated power Pm of the second MG 15 is secured, and the second MG 15 can generate a sufficient torque Tm. Thus, it is possible to suppress vehicle downhill movement.

Figure 10:
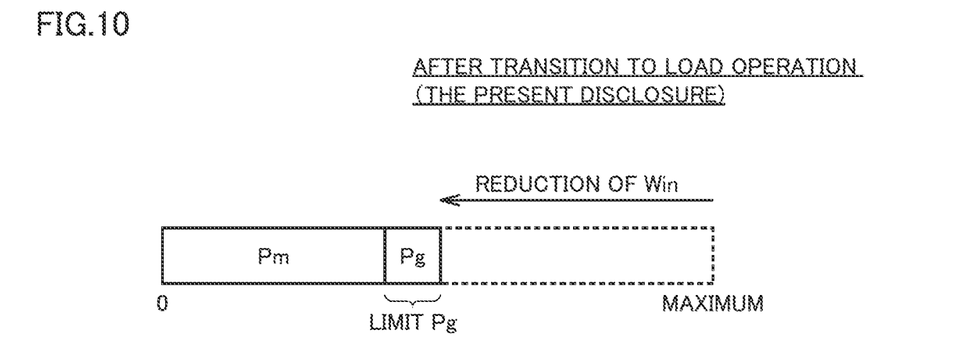
FIG. 10 is a diagram showing input limit Win and charging power of the power storage device under the situation shown in FIG. 9.

FIG. 10 is a diagram showing input limit Win and charging power of power storage device 18 under the situation shown in FIG. 9. Referring to FIG. 10, in hybrid vehicle 10 according to the first embodiment, power generation Pg of first MG 14 is suppressed as compared with the comparative example shown in FIG. 8. Thus, the power generation power Pm of the second MG 15 is secured, and the second MG 15 can generate a sufficient torque Tm.

The limit value of the torque Tg for suppressing the power generation power Pg may be appropriately set based on a previous evaluation, but in the first embodiment, the limit value is calculated from the input limit Win of the power storage device 18, the second MG required power Pmr, and the rotation speed Ng of the first MG 14. Specifically, the limit value Tglim of the torque Tg of the first MG 14 is calculated by the following equation.

$$Tglim=(Win-Pmr)/Ng \quad (2)$$

The second MG required power Pmr is a product of a predetermined torque of the second MG 15 required to suppress vehicle downhill movement and the rotation speed Nm. By limiting the torque Tg of the first MG 14 to the limit value Tglim, it is possible to ensure the torque Tm of the second MG 15 required to suppress the vehicle downhill movement.

Figure 11:
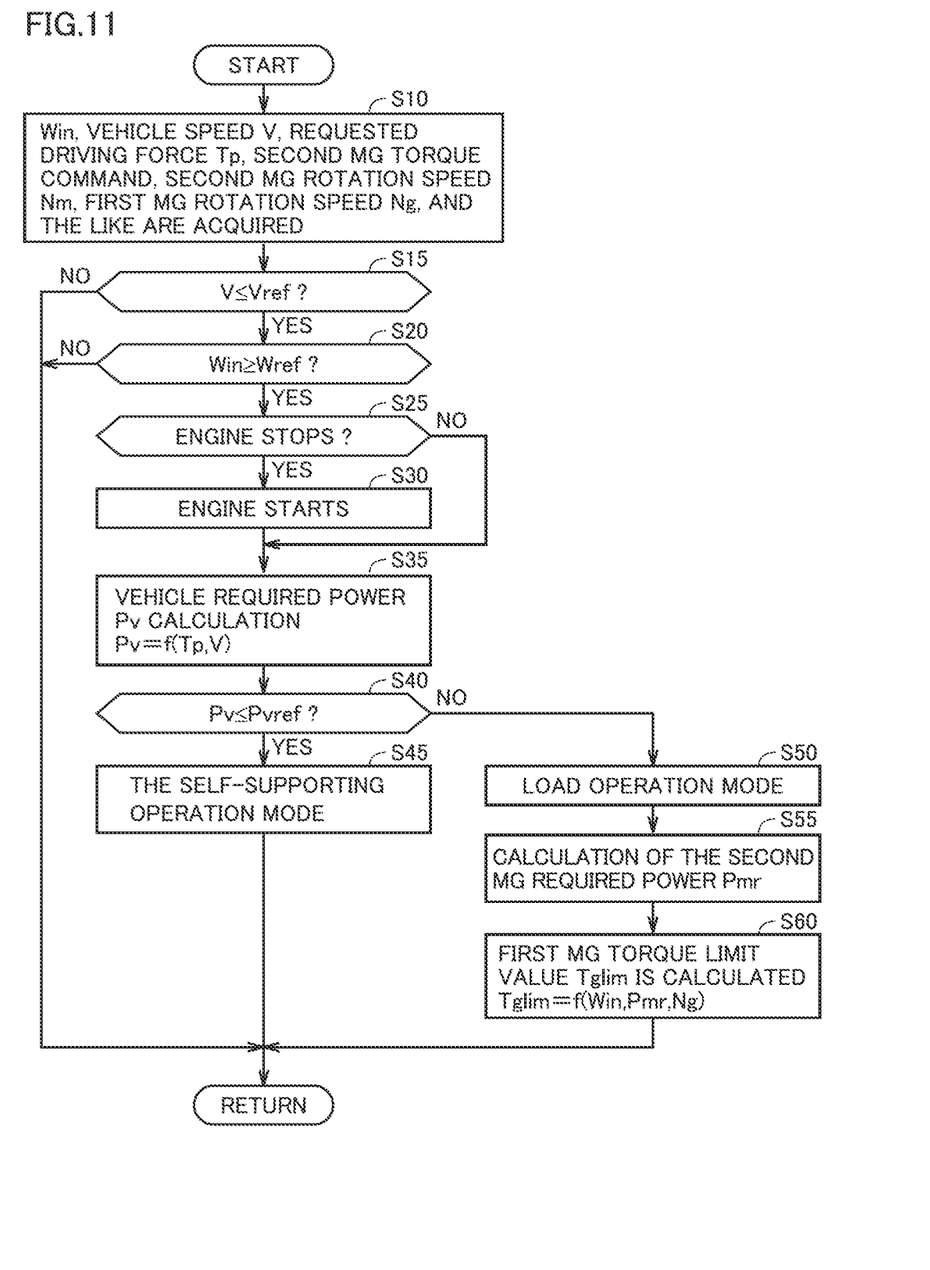
FIG. 11 is a flowchart showing an example of a procedure of processing executed by the HV-ECU when a low Win drop occurs.

FIG. 11 is a flowchart showing an example of a procedure of processing executed by the HV-ECU 61 when a low Win downhill movement occurs. The series of processes shown in this flowchart is repeatedly executed at predetermined intervals when the shift position is in the D range.

Referring to FIG. 11, HV-ECU 61 obtains input limit Win of power storage device 18, vehicle speed V, vehicle required driving force Tp, second MG torque command, rotation speeds Ng and Nm of first and second MGs, and the like (step S10). The input limit Win is acquired from the battery ECU 62, and the vehicle speed V and the rotation speeds Ng and Nm are acquired from corresponding sensors. The required driving force Tp and the second MG torque command are calculated in a running control process described later.

Next, the HV-ECU 61 determines whether or not the vehicle speed V is equal to or less than the threshold value Vref (step S15). The threshold value Vref is a vehicle speed for detecting a vehicle downhill movement, and is set to a small negative value, and if the vehicle speed V is equal to or less than the threshold value Vref, it is determined that the vehicle downhill movement has occurred.

When the vehicle speed V is higher than the threshold Vref (NO in step S15), the HV-ECU 61 shifts the process to return without executing a series of transition processes. If it is determined in step S15 that the vehicle speed V is equal to or less than the threshold value Vref (YES in step S15), it is determined that the vehicle downhill movement has occurred, and the HV-ECU 61 determines whether or not the input limit Win of the power storage device 18 is equal to or more than the threshold value Wref (step S20). The threshold value Wref is a value for determining whether or not the torque Tm is in a state where the torque Tm is likely to be limited due to suppression of the power generation power Pm of the second MG 15, and is set to an appropriate negative value based on a previous evaluation or the like.

When the input limit Win is lower than the threshold value Wref (NO in step S20), that is, when the magnitude of the input limit Win is larger than the magnitude of the threshold value Wref, the HV-ECU 61 shifts the process to return without executing a series of transition processes.

If it is determined in step S20 that the input limit Win is equal to or greater than the threshold value Wref (YES in step S20), that is, if the magnitude of the input limit Win is equal to or less than the threshold value Wref, it is determined that the torque Tm of the second MG 15 is in a state in which the torque Tm is easily limited. Then, the HV-ECU 61 determines whether or not the engine 13 is stopped in preparation for the possibility that the engine 13 compensates for the driving force that is insufficient when the torque Tm is limited (step S25). When the engine 13 is stopped (YES in step S25), the HV-ECU 61 outputs a start command of the engine 13 to the engine ECU 64 to start the engine 13 (step S30).

That is, the engine 13 is cranked by the first MG 14, and the engine 13 is started by starting fuel injection and ignition when the engine rotation speed Ne reaches a predetermined speed (e.g., 600 rpm or 800 rpm) or more. When the engine 13 is started, the HV-ECU 61 prohibits the stop of the engine 13 until at least the vehicle downhill movement is not detected (until the vehicle speed V becomes higher than the threshold value Vref).

Next, the HV-ECU 61 calculates the vehicle required power Pv (step S35). The vehicle required power Pv is calculated by multiplying the required driving force Tp acquired in step S10 by the vehicle speed V and adding a predetermined loss power. Then, the HV-ECU 61 determines whether or not the vehicle required power Pv is equal to or less than the threshold value Pvref (step S40). The threshold value Pvref is a determination value for determining whether or not to shift the engine 13 from the self-supporting operation to the load operation.

When it is determined that the vehicle required power Pv is equal to or less than the threshold value Pvref (YES in step S40), the HV-ECU 61 operates the engine 13 in the self-supporting operation mode (step S45). In the self-supporting operation mode, the engine ECU 64 controls the throttle valve, the injector, the spark plug, and the like so that the engine 13 operates at a prescribed rotational speed (for example, 1000 rpm, 1200 rpm, and the like). In the self-supporting operation mode, since the engine 13 does not output the driving force for driving the vehicle, the MG-ECU 63 sets the first MG torque command to 0.

On the other hand, if it is determined in step S40 that the vehicle required power Pv is greater than the threshold value Pvref (NO in step S40), the HV-ECU 61 operates the engine 13 in the load driving mode (step S50). In the load operation mode, an engine power command, a first MG torque command, and a second MG torque command are calculated in accordance with a running control process described later, and the engine 13, the first MG 14, and the second MG 15 are controlled in accordance with these commands.

In the load operation mode, the target rotation speed of the engine 13 is calculated based on the engine power command, and feedback control is executed so that the engine rotation speed Ne becomes the target rotation speed. Specifically, the first MG torque command is calculated such that the rotation speed Ne approaches the target rotation speed, and the torque Tg of the first MG 14 is controlled in accordance with the first MG torque command.

Next, the HV-ECU 61 calculates the required power Pmr of the second MG 15 (step S55). The second MG required power Pmr is calculated by multiplying a predetermined torque of the second MG 15 required to suppress vehicle downhill movement by the rotation speed Nm of the second MG 15. Then, the HV-ECU 61 calculates a torque limit value Tglim of the first MG 14 for limiting the power generation power Pg of the first MG 14 so that the second MG required power Pmr is secured under the input limit Win of the power storage device 18 using the above equation (2) (step S60).

Figure 12:
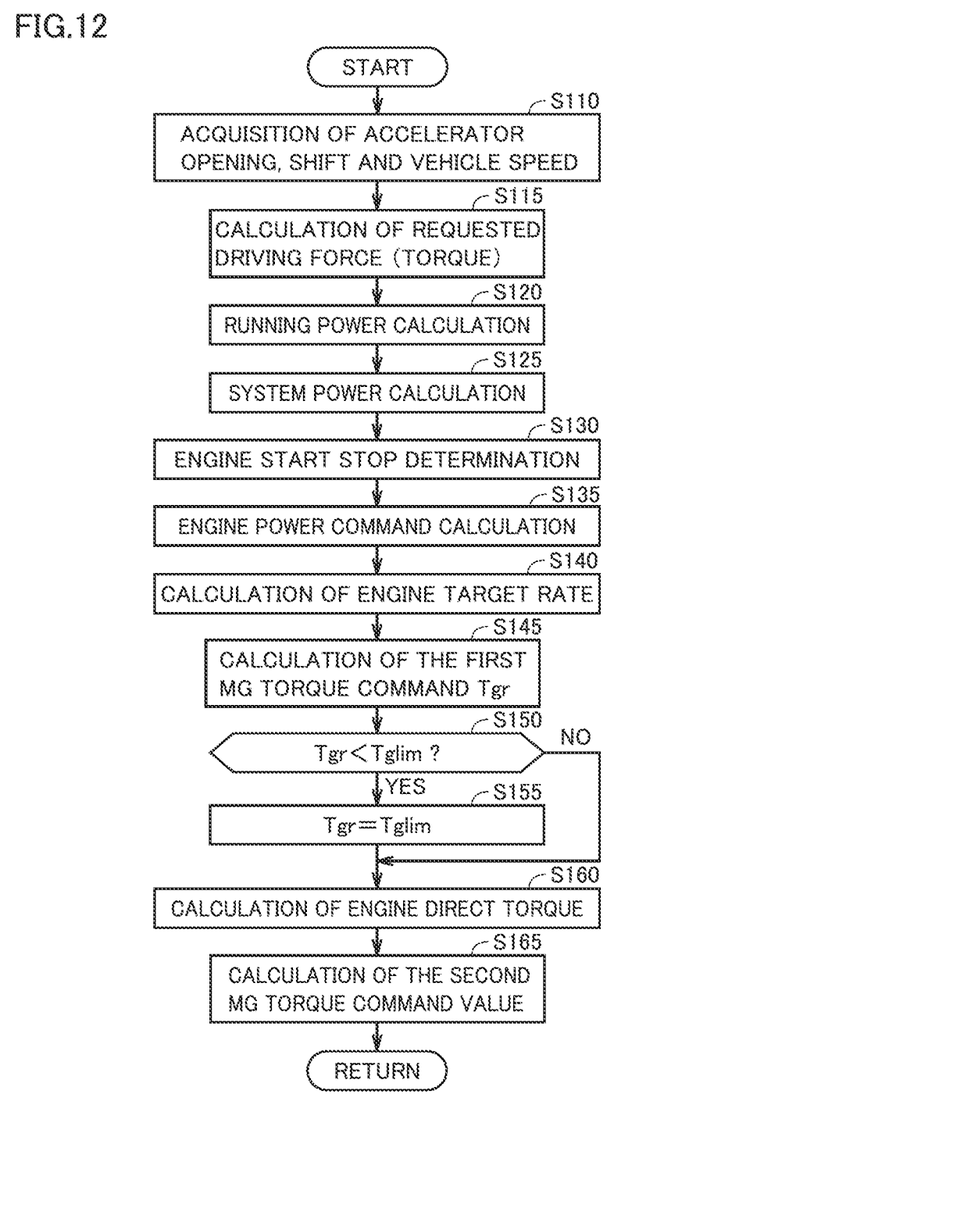
FIG. 12 is a flowchart showing an example of a procedure of a travel control process for determining the operation of the engine, the first MG, and the second MG.

FIG. 12 is a flowchart showing an example of a procedure of a travel control process for determining the operation of the engine 13, the first MG 14, and the second MG 15. A series of processes shown in this flowchart is repeatedly executed by the HV-ECU 61 at predetermined intervals.

Referring to FIG. 12, HV-ECU 61 obtains information such as an accelerator pedal position, a shift range during selection, and a vehicle speed V (step S110). The accelerator opening degree is calculated based on the detection value of the accelerator position sensor 72, and the vehicle speed V is detected by the vehicle speed sensor 74. Instead of the vehicle speed V, the rotational speeds of the drive shafts 32 and 33 and the output shaft 12 may be used.

Next, the HV-ECU 61 calculates the required driving force (torque) from the information acquired in step S10 using a driving force map that is prepared in advance for each shift range and indicates the relationship among the required driving force, the accelerator pedal position, and the vehicle speed (step S115). Then, the HV-ECU 61 multiplies the calculated required driving force by the vehicle speed V and adds a predetermined loss power to calculate the traveling power of the vehicle (step S120).

Subsequently, when there is a charge/discharge request (power) for the power storage device 18, the HV-ECU 61 calculates a value obtained by adding the charge/discharge request (charging is a positive value) to the calculated traveling power as the system power (step S125). Note that the charge/discharge request may be, for example, a larger positive value when the SOC of the power storage device 18 is low, and may be a negative value when the SOC is high.

Next, the HV-ECU 61 determines the operation/stop of the engine 13 based on the calculated system power and traveling power (step S130). For example, when the system power is greater than the first threshold value or when the traveling power is greater than the second threshold value, it is determined that the engine 13 is to be operated.

When the HV-ECU 61 determines that the engine 13 is to be operated, the HV-ECU 61 executes the processing from step S135 onward (HV traveling mode).

Although not particularly shown, when it is determined that the engine 13 is stopped (EV travel mode), the torque command of the second MG 15 is calculated based on the required driving force.

During operation of the engine 13, the HV-ECU 61 calculates the power Pe of the engine 13 from the system power calculated in step S125 (step S135). The power Pe is calculated by performing various corrections, limitations, and the like on the system power. The calculated power Pe of the engine 13 is output to the engine ECU 64 as an engine power command.

Next, the HV-ECU 61 calculates a target rotation speed Net indicating the target engine rotation speed (step S140). For example, the target rotational speed Net is calculated such that the engine 13 operates at a predetermined operating point where the fuel consumption of the engine 13 is minimum at the calculated engine power Pe. When the target rotational speed Net is determined, the torque Te (target engine torque) of the engine 13 is also determined. Thus, the operating point of the engine 13 is determined.

Next, the HV-ECU 61 calculates the torque command Tgr of the first MG 14 (step S145). Specifically, the HV-ECU 61 sets the first MG torque command Tgr according to the following expression (3) so that the engine rotational speed Ne becomes the target rotational speed Net.

$$Tgr = K1 \times (Net - Ne) + K2 \times \int (Net - Ne) dt \quad (3)$$

This expression is a relational expression in feedback control for rotating the engine 13 at the target rotation speed Net. In Equation (3), K1 is the gain of the proportional term, and K2 is the gain of the integral term.

Next, the HV-ECU 61 determines whether or not the calculated first MG torque command Tgr is lower than the limit value Tglim (step S150). The limit value Tglim is a value (negative value) calculated in step S60 of FIG. 11. In step S150, it is determined whether or not the magnitude of the first MG torque command Tgr in the negative direction is larger than the magnitude of the limit value Tglim during the operation of the engine 13.

If it is determined in step S150 that the first MG torque command Tgr is lower than the limit value Tglim (YES in step S150), the first MG torque command Tgr is limited to the limit value Tglim (step S155). Then, the first MG torque command Tgr is output to the MG-ECU 63.

Next, the HV-ECU 61 calculates the engine direct torque Tep (step S160). Since the relationship between the engine direct torque Tep and the torque Tg of the second MG 15 is uniquely determined by the gear ratio of the planetary gear mechanism 20, the engine direct torque Tep can be calculated from the calculated first MG torque command Tgr.

Finally, the HV-ECU 61 calculates the torque command Tmr of the second MG 15 (step S165). The second MG torque command Tmr is determined so as to realize the required driving force (torque) calculated in step S115, and can be calculated by dividing a value obtained by subtracting the engine direct torque Tep from the required driving force converted on the output shaft 12 by the gear ratio of the planetary gear mechanism. Then, the second MG torque command Tmr is output to the MG-ECU 63.

The engine direct torque Tep is calculated from the first MG torque command Tgr, and the first MG torque command Tgr is limited by the limit value Tglim. Since the limit value Tglim is a limit value for ensuring the torque of the second MG 15 required to suppress the vehicle downhill movement, the second MG torque command Tmr calculated in step S165 is a torque capable of suppressing the vehicle downhill movement when the low Win downhill movement occurs.

As described above, in the first embodiment, when the input limit Win of the power storage device 18 is lowered in the situation of vehicle downhill movement and the engine 13 is driving under load, the torque of the first MG 14 is suppressed to the limit value Tglim or less. Thus, the power generation amount of the first MG 14 is suppressed, the power generation amount of the second MG 15 is secured, and the torque (regeneration torque) of the second MG 15 is secured. Therefore, according to the first embodiment, it is possible to suppress vehicle downhill movement without the driver feeling uncomfortable.

In the first embodiment, the torque limit value Tglim of the first MG 14 is calculated based on the input limit Win of the power storage device 18 and the second MG required power Pmr. Thus, the torque of the first MG 14 is restricted more than necessary, and the controllability of the engine rotational speed Ne is prevented from being significantly reduced.

Embodiment 2

In the first embodiment, in order to ensure the torque of the second MG 15 required to suppress the vehicle downhill movement, the torque of the first MG 14 is limited to limit the power generation amount of the first MG 14. In the second embodiment, the reduction rate of the engine rotational speed Ne is limited to limit the power generation amount of the first MG 14.

As an example, in the second embodiment, the reduction rate of the engine rotational speed Ne is limited to a reduction rate corresponding to the reduction in the engine rotational speed Ne due to friction (Hereinafter, this is referred to as "engine friction") of the engine 13. Thus, it is not necessary to output the torque (regenerative torque) of the first MG 14 in order to reduce the engine rotation speed Ne overshooted after the engine is started, and the torque and the power generation amount of the first MG 14 in order to reduce the engine rotation speed Ne can be suppressed.

The configuration of the hybrid vehicle according to the second embodiment is the same as that of the hybrid vehicle 10 shown in FIGS. 1 and 2.

Figure 13:
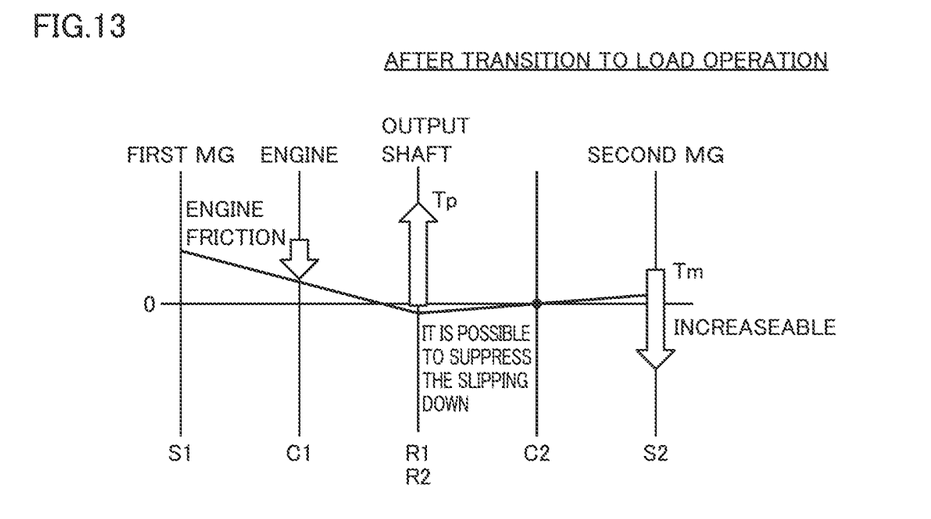
FIG. 13 is an alignment chart after the engine transitions from the self-supporting operation to the load operation during the vehicle downhill movement occurs with low Win in the second embodiment.

FIG. 13 is an alignment chart after the engine 13 shifts from the self-supporting operation to the load operation during the vehicle downhill movement occurs with low Win in the second embodiment. Referring to FIG. 13, in the second embodiment, when the operation transitions from the self-supporting operation to the load operation immediately after the engine 13 is started, the engine 13 is controlled such that the engine rotational speed Ne decreases at a reduction rate corresponding to the reduction in the rotational speed due to the engine friction in order to reduce the engine rotational speed Ne exceeding the target rotational speed to the target rotational speed due to the overshoot after the engine is started. Thus, the first MG 14 does not need to output a torque for decreasing the engine rotational speed Ne, and the first MG torque command is set to a suppressed value.

Since the power generation power Pg of the first MG 14 is suppressed, the power generation power Pm of the second MG 15 is secured, and the second MG 15 can generate a sufficient torque Tm. Thus, the vehicle can be prevented from falling downward.

Figure 14:
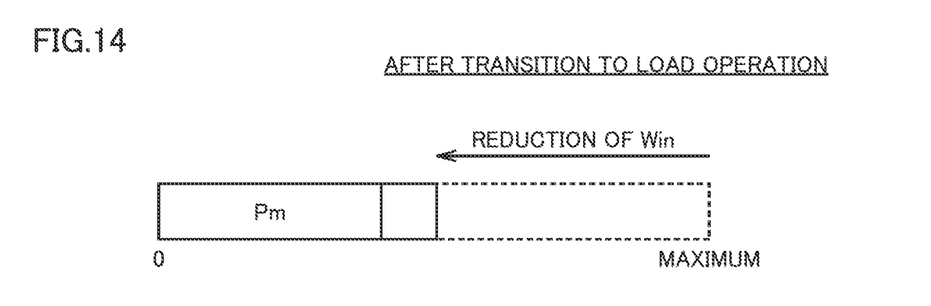
FIG. 14 is a diagram showing input limit Win and charging power of the power storage device under the situation shown in FIG. 13.

FIG. 14 is a diagram showing input limit Win and charging power of power storage device 18 under the situation shown in FIG. 13. Referring to FIG. 14, hybrid vehicle 10 according to the second embodiment can suppress power generation Pg of first MG 14 by decreasing engine rotation speed Ne at a reduction rate corresponding to the reduction in rotation speed due to engine friction. Thus, the power generation power Pm of the second MG 15 is secured, and the second MG 15 can generate a sufficient torque Tm.

Figure 15:
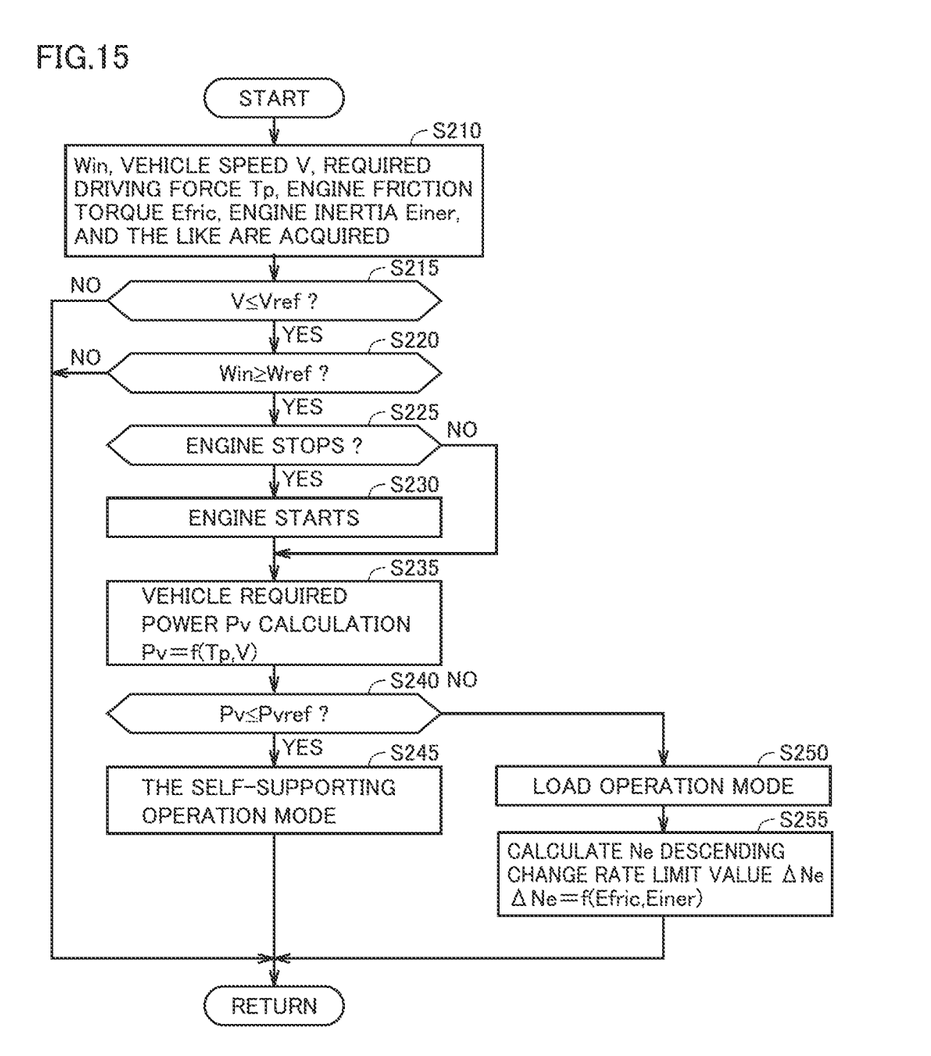
FIG. 15 is a flowchart showing an example of a procedure of processing executed by the HV-ECU when a low Win downhill movement occurs in the second embodiment.

FIG. 15 is a flowchart showing an example of a procedure of processing executed by the HV-ECU 61 when a low Win downhill movement occurs in the second embodiment. This flowchart corresponds to the flowchart shown in FIG. 11 in the first embodiment. The series of processes shown in this flowchart is also repeatedly executed at predetermined intervals when the shift position is in the D range.

Referring to FIG. 15, HV-ECU 61 obtains input limit Win of power storage device 18, vehicle speed V, vehicle required driving force Tp, engine friction torque Efric of engine 13, engine inertia Einer, and the like (step S210). The engine friction torque Efric and the engine inertia Einer are determined in advance by experiments, calculations, etc., and stored in the memory of the HV-ECU 61.

The processes of steps S215 to S250 are the same as the processes of steps S15 to S50 shown in FIG. 11, respectively. When the engine 13 is in the load operation mode (step S250), the HV-ECU 61 calculates a Ne decrease change rate limit value ΔNe limiting the decrease rate of the engine rotational speed Ne (step S255). In the second embodiment, the limit value ΔNe is a reduction rate corresponding to a reduction in the engine rotation speed Ne due to engine friction, and is calculated by the following equation.

$$\Delta Ne = Efric/Einer \quad (4)$$

In the second embodiment, in the traveling control process shown in FIG. 12, the target rotation speed Net indicating the target of the engine rotation speed is limited by the reduction rate corresponding to the reduction in the engine rotation speed Ne due to the engine friction. The second MG torque Tmr is calculated based on the required driving force of the vehicle.

As described above, in the second embodiment, when the input limit Win of the power storage device 18 is lowered in a situation where the vehicle falls down, when the engine 13 is driving under load, the rate of change of the engine rotational speed Ne when the engine rotational speed Ne is lowered is limited to the limit value ΔNe. Thus, the power generation amount of the first MG 14 is suppressed, the power generation amount of the second MG 15 is secured, and the torque (regeneration torque) of the second MG 15 is secured. Therefore, according to the second embodiment, it is possible to suppress vehicle downhill movement without the driver feeling uncomfortable.

In the second embodiment, the limit value ΔNe of the rate of change of the engine rotational speed Ne when the engine rotational speed Ne is reduced is calculated based on the friction torque of the engine 13. Accordingly, it is possible

What is claimed is:

1. A hybrid vehicle, comprising:
an internal combustion engine;
a first rotating electrical machine;
a planetary gear mechanism in which the internal combustion engine, the first rotating electrical machine, and an output shaft are connected;
a second rotating electrical machine connected to the output shaft;
a power storage device capable of storing electric power generated by the first rotating electrical machine and electric power generated by the second rotating electrical machine; and
a control device that controls the internal combustion engine and the first and second rotating electrical machines, wherein
the control device
controls the first and second rotating electrical machines so that input power to the power storage device does not exceed an input limit value indicating a limit of the input power,
controls the first rotating electrical machine and the internal combustion engine so that a rotational speed of the internal combustion engine approaches a target when the internal combustion engine is operating under load, and
under a situation of a vehicle downhill movement where the hybrid vehicle moves backward while generating torque in a forward direction by the second rotating electrical machine, when the input limit value is equal to or less than a threshold value and the internal combustion engine is operating under load, the control device suppresses a power generation amount of the first rotating electrical machine to be equal to or less than a predetermined value.

2. The hybrid vehicle according to claim 1, wherein under the situation of the vehicle downhill movement, when the input limit value is lower than or equal to the threshold value and the internal combustion engine is operating under load, the control device suppresses a regenerative torque of the first rotating electrical machine to be equal to or less than a predetermined limit value.

3. The hybrid vehicle according to claim 2, wherein the predetermined limit value is calculated based on the input limit value and a required power of the second rotating electrical machine.

4. The hybrid vehicle according to claim 1, wherein under the situation of the vehicle downhill movement, when the input limit value is lower than or equal to the threshold value and the internal combustion engine is operating under load, the control device suppresses a rate of change of the rotational speed of the internal combustion engine to be equal to or less than a predetermined limit value when the rotational speed of the internal combustion engine is lowered.

5. The hybrid vehicle according to claim 4, wherein the predetermined limit value is calculated based on a friction torque of the internal combustion engine.

6. A method of controlling a hybrid vehicle,
the hybrid vehicle including:
an internal combustion engine;
a first rotating electrical machine;
a planetary gear mechanism in which the internal combustion engine, the first rotating electrical machine, and an output shaft are connected;
a second rotating electrical machine connected to the output shaft; and
a power storage device capable of storing electric power generated by the first rotating electrical machine and electric power generated by the second rotating electrical machine,
the method comprising:
controlling the first and second rotating electrical machines so that input power to the power storage device does not exceed an input limit value indicating a limit of the input power;
controlling the first rotating electrical machine and the internal combustion engine so that a rotational speed of the internal combustion engine approaches a target when the internal combustion engine is operating under load; and
suppressing a power generation amount of the first rotating electrical machine to be equal to or less than a predetermined value, under a situation of a vehicle downhill movement where the hybrid vehicle moves backward while generating torque in a forward direction by the second rotating electrical machine, when the input limit value is equal to or less than a threshold value and the internal combustion engine is operating under load.

7. The method of controlling a hybrid vehicle according to claim 6, wherein, under the situation of the vehicle downhill movement, when the input limit value is lower than or equal to the threshold value and the internal combustion engine is operating under load, the suppressing includes suppressing a regenerative torque of the first rotating electrical machine to be equal to or less than a predetermined limit value.

8. The method of controlling a hybrid vehicle according to claim 7, wherein the predetermined limit value is calculated based on the input limit value and a required power of the second rotating electrical machine.

9. The method of controlling a hybrid vehicle according to claim 6, wherein under the situation of the vehicle downhill movement, when the input limit value is lower than or equal to the threshold value and the internal combustion engine is operating under load, the suppressing includes suppressing a rate of change of the rotational speed of the internal combustion engine to be equal to or less than a predetermined limit value when the rotational speed of the internal combustion engine is lowered.

10. The method of controlling a hybrid vehicle according to claim 9, wherein the predetermined limit value is calculated based on a friction torque of the internal combustion engine.

* * * * *